United States Patent [19]
Dent et al.

[11] Patent Number: 5,977,226
[45] Date of Patent: Nov. 2, 1999

[54] VACUUM DISPENSABLE SILICONE COMPOSITIONS

[75] Inventors: Stanton James Dent, Midland, Mich.; Edward Joseph Benson, Fremont, Calif.; Ann Walstrom Norris; Yeong Joo Lee, both of Midland, Mich.

[73] Assignee: Dow Corning Corporation, Midland, Mich.

[21] Appl. No.: 09/072,229

[22] Filed: May 4, 1998

[51] Int. Cl.$^6$ ........................................ C08K 5/54
[52] U.S. Cl. .............. 524/267; 528/15; 528/31; 528/32; 524/404; 524/428; 524/430; 524/437; 524/731; 524/786
[58] Field of Search .................. 528/15, 31, 32; 524/786, 787, 267, 765, 731, 430, 437, 404, 428; 427/350, 294

[56] References Cited

U.S. PATENT DOCUMENTS

| | | |
|---|---|---|
| 4,082,726 | 4/1978 | Mine et al. . |
| 4,427,801 | 1/1984 | Sweet . |
| 4,500,659 | 2/1985 | Kroupa et al. . |
| 4,882,398 | 11/1989 | Mbah . |
| 5,519,082 | 5/1996 | Yoshino . |
| 5,872,170 | 2/1999 | Mine et al. ............... 524/440 |

Primary Examiner—Melvyn I. Marquis
Assistant Examiner—Mark W. Milstead
Attorney, Agent, or Firm—Larry A. Milco

[57] ABSTRACT

A vacuum dispensable silicone composition comprising (A) a polydiorganosiloxane containing an average of at least two silicon-bonded alkenyl groups per molecule; (B) an organopolysiloxane resin consisting essentially of (a) $R^3_2(CH_2=CH)SiO_{1/2}$ siloxane units, (b) $R^3_3SiO_{1/2}$ siloxane units, and (c) $SiO_{4/2}$ siloxane units wherein each $R^3$ is independently selected from the group consisting of monovalent hydrocarbon and monovalent halogenated hydrocarbon groups free of aliphatic unsaturation, the mole ratio of the combination of (a) and (b) units to (c) units is from 0.6 to 1.1, and the resin contains 1 to 5 percent by weight of vinyl groups; (C) an organohydrogenpolysiloxane having an average of at least three silicon-bonded hydrogen atoms per molecule in an amount sufficient to provide from one to three silicon-bonded hydrogen atoms per alkenyl group in components (A) and (B) combined; (D) an adhesion promoter in an amount sufficient to effect adhesion of the composition to a substrate; (E) a hydrosilylation catalyst; (F) a platinum catalyst inhibitor having a boiling point greater than 150 ° C. at 0.10 MPa in an amount sufficient to retard curing of the composition at ambient temperature; wherein the composition is substantially free of air.

33 Claims, No Drawings

VACUUM DISPENSABLE SILICONE COMPOSITIONS

FIELD OF THE INVENTION

The present invention relates to silicone compositions, and more particularly to vacuum dispensable silicone compositions that are substantially free of air. This invention also relates to methods for the preparation of such compositions and to cured silicone compositions formed therefrom.

BACKGROUND OF THE INVENTION

Silicones are widely used in the electrical and electronics industries as a result of their unique properties. Silicones exhibit low alpha particle emissions, very good moisture resistance, excellent electrical insulation, excellent thermal stability, and very high ionic purity. In particular, silicone encapsulants can improve the reliability of an electronic device by providing an effective barrier against environmental moisture, UV radiation, ozone, and weathering.

Moreover, recent advances in semiconductor packaging, namely, the development of chip scale or chip size packages, have created a critical demand for high performance, vacuum dispensable silicone encapsulants. In addition to the aforementioned properties of electronic grade silicone materials, such encapsulants must be compatible with the new vacuum dispensing systems and possess the rheological properties required for flow around and/or under the silicon chip or die.

Addition-curable silicone compositions comprising an alkenyl-containing polydiorganosiloxane, an organopolysiloxane resin, an organohydrogenpolysiloxane crosslinking agent, and a hydrosilylation catalyst are well known in the art. Illustrative of such compositions are U.S. Pat. No. 4,427,801 to Sweet; U.S. Pat. No. 4,500,659 to Kroupa et al.; U.S. Pat. No. 4,882,398 to Mbah; U.S. Pat. No. 5,519,082 to Yoshino; and U.S. Pat. No. 4,082,726 to Mine et al.

However, conventional silicone compositions, including the preceding, are unsuitable for vacuum dispensing processes used in the fabrication of chip scale packages, due at least in part to excessive outgassing. Conventional silicone compositions evolve copious amounts of air during vacuum dispensing. Also, low boiling components in the compositions, either initially present or later formed during storage, also contribute to gas evolution. The rapidly escaping gas bubbles cause foaming and splattering of the encapsulant, resulting in contamination of the exposed surface of the semiconductor device. An additional cleaning step is required to remove encapsulant from the contaminated die surface. Moreover, extensive gas evolution produces voids in the encapsulant layer, resulting in incomplete underfill of the device. Contamination and residual voids become increasingly conspicuous as the complexity of the device increases and its dimensions decrease. In the fabrication of chip scale or chip size semiconductor packages, these encapsulation problems result in increased costs and reduced component reliability.

SUMMARY OF THE INVENTION

The present invention is directed to a silicone composition which satisfies the aforementioned need for a vacuum dispensable silicone encapsulant. The inventors have discovered that the excessive outgassing characteristic of conventional addition-curable silicone compositions during vacuum dispensing is due to the presence of air and low molecular weight volatile components in the compositions. Moreover, the inventors have overcome the outgassing problem and its deleterious effects, including contamination and void formation.

Specifically, the present invention is directed to a silicone composition comprising:

(A) 100 parts by weight of a polydiorganosiloxane containing an average of at least two silicon-bonded alkenyl groups per molecule;

(B) 10 to 100 parts by weight of an organopolysiloxane resin consisting essentially of (a) $R^3_2(CH_2=CH)SiO_{1/2}$ siloxane units, (b) $R^3_3SiO_{1/2}$ siloxane units, and (c) $SiO_{4/2}$ siloxane units wherein each $R^3$ is independently selected from the group consisting of monovalent hydrocarbon and monovalent halogenated hydrocarbon groups free of aliphatic unsaturation, the mole ratio of the combination of (a) and (b) units to (c) units is from 0.6:1 to 1.1:1, and the resin contains from 1 to 5 percent by weight of vinyl groups;

(C) an organohydrogenpolysiloxane having an average of at least three silicon-bonded hydrogen atoms per molecule in an amount sufficient to provide from one to three silicon-bonded hydrogen atoms per alkenyl group in components (A) and (B) combined;

(D) an adhesion promoter in an amount sufficient to effect adhesion of the composition to a substrate;

(E) a hydrosilylation catalyst in an amount sufficient to provide from 0.1 to 1000 parts per million of a platinum group metal based on the combined weight of components (A), (B) and (C); and (F) a platinum catalyst inhibitor having a boiling point greater than 150° C. at 0.10 MPa in an amount sufficient to retard curing of the composition at ambient temperature; and wherein the composition comprising components (A) through (F) is substantially free of air.

The present invention is also directed to a cured composition comprising a reaction product of the composition described above.

The present invention is further directed to a multi-part silicone composition comprising components (A) through (F) specified above, wherein each part of the composition is substantially free of air, and with the proviso that neither the polydiorganosiloxane nor the organopolysiloxane resin are present with the organohydrogenpolysiloxane and the hydrosilylation catalyst in the same part.

The instant invention is still further directed to a method of preparing a silicone composition, comprising the steps of mixing components (A) through (F) delineated above and de-airing the mixture to produce a composition substantially free of air.

The compositions of the instant invention are substantially free of air and contain only components that are nonvolatile under vacuum dispense conditions, which is typically performed at a pressure of from 4,000 to 10,700 Pa. Compared to conventional silicone compositions, the present compositions exhibit extremely low outgassing during vacuum dispensing. The compositions can be vacuum dispensed with negligible or no contamination of unexposed die surfaces, thus eliminating the need for an additional cleaning step in the fabrication of a chip scale package. The compositions of the present invention produce a uniform protective layer substantially free of voids. Moreover, the present compositions possess the aforementioned advantages of silicone materials, including high radiological purity for RAM applications; low levels of ionic impurities (e.g., sodium, potassium, chloride); excellent electrical properties, such as a low dielectric constant and dissipation factor; and a low modulus, which reduces thermal stresses in the package. The compositions of the present invention are useful as encapsulants in the fabrication of chip scale or chip size semiconductor packages.

These and other features, aspects, and advantages of the present invention will become better understood with reference to the following description and appended claims.

DETAILED DESCRIPTION OF THE INVENTION

Component (A) of the present invention is a polydiorganosiloxane containing an average of at least two silicon-bonded alkenyl groups per molecule. Suitable alkenyl groups contain from 2 to about 6 carbon atoms and are exemplified by, but not limited to vinyl, allyl, and 6-hexenyl. The alkenyl groups in component (A) may be located at terminal, pendant, or both terminal and pendant positions. The remaining silicon-bonded organic groups in component (A) are independently selected from the group consisting of monovalent hydrocarbon and monovalent halogenated hydrocarbon groups free of aliphatic unsaturation. These groups typically contain from 1 to about 8 carbon atoms, preferably from 1 to 4 carbon atoms, and are exemplified by, but not limited to alkyl such as methyl, ethyl, propyl, and butyl; aryl such as phenyl; and halogenated alkyl such as 3,3,3-trifluoropropyl. Typically, at least 50 percent of the organic groups in component (A) are methyl. In a preferred embodiment of the present invention, component (A) is free of aryl groups.

The structure of component (A) is typically linear, however it may contain some branching due to the presence of trifunctional siloxane units. The viscosity of component (A) at 25° C., which varies with molecular weight and structure, is typically from 1 to 100 Pa·s, preferably from 1 to 50 Pa·s, and more preferably from 2 to 30 Pa·s.

Preferably, component (A) is a polydiorganosiloxane having the general formula $R^2R^1_2SiO(R^1_2SiO)_nSiR^1_2R^2$ wherein each $R^1$ is independently selected from the group consisting of monovalent hydrocarbon and monovalent halogenated hydrocarbon groups free of aliphatic unsaturation, as defined above; $R^2$ is alkenyl, as defined above; and n has a value such that the viscosity of component (A) at 25° C. is in one of the ranges cited above. Preferably, $R^1$ is methyl and $R^2$ is vinyl.

Component (A) can comprise a single polydiorganosiloxane or a mixture of two or more polydiorganosiloxanes having different viscosities. For example, component (A) can comprises a first polydiorganosiloxane having a viscosity of from 40 to 100 Pa·s at 25° C. and a polydiorganosiloxane having a viscosity of from 1 to 10 Pa·s at 25° C. In a preferred embodiment, component (A) comprises a first polydiorganosiloxane having a viscosity of from 45 to 65 Pa·s at 25° C., and 10 to 50 percent, preferably 20 to 30 percent by weight, of a polydiorganosiloxane having a viscosity of from 1.8 to 2.4 Pa·s at 25° C. In this embodiment, the lower viscosity polydiorganosiloxane improves both the flow of the liquid composition and the solvent resistance of the cured silicone product.

Specific examples of polydiorganosiloxanes useful in the present invention include, but are not limited to, the following: $ViMe_2SiO(Me_2SiO)_nSiMe_2Vi$, $ViMe_2SiO(Me_2SiO)_{0.92n}(MePhSiO)_{0.08n}SiMe_2Vi$, $ViMe_2SiO(Me_2SiO)_{0.98n}(MeViSiO)_{0.02n}SiMe_2Vi$, $Me_3SiO(Me_2SiO)_{0.95n}(MeViSiO)_{0.05n}SiMe_3$, $PhMeViSiO(Me_2SiO)_nSiPhMeVi$, and others, where Me, Vi, and Ph denote methyl, vinyl, and phenyl respectively and n is as defined above. Preferred polydiorganosiloxanes are dimethylvinylsiloxy-terminated polydimethylsiloxanes.

Methods for preparing component (A) of the present compositions, such as condensation of the corresponding halosilanes or equilibration of cyclic polydiorganosiloxanes, are well known in the art.

Component (B) of the present invention is an organopolysiloxane resin consisting essentially of (a) $R^3_2(CH_2=CH)SiO_{1/2}$ siloxane units, (b) $R^3_3SiO_{1/2}$ siloxane units, and (c) $SiO_{4/2}$ siloxane units wherein each $R^3$ is independently selected from the group consisting of monovalent hydrocarbon and monovalent halogenated hydrocarbon groups free of aliphatic unsaturation, as defined above for component (A). Typically at least 50 percent, and preferably all of the $R^3$ groups in formulae (a) and (b) are methyl. The mole ratio of the combination of (a) and (b) units to (c) units is from 0.6 to 1.1, and preferably from 0.7 to 0.9, as determined by $^{29}Si$ nuclear magnetic resonance ($^{29}SiNMR$) spectrometry. The resin contains from 1 to 5 percent by weight of vinyl groups and preferably contains an average of at least two vinyl groups per molecule. The silicon-bonded hydroxyl content of component (A), as determined by $^{29}SiNMR$ spectrometry, is less than about 2 percent by weight based on the total weight of the resin.

A preferred organopolysiloxane resin contains $(CH_3)_2CH_2=CHSiO_{1/2}$ siloxane units, $(CH_3)_3SiO_{1/2}$ siloxane units, and $SiO_{4/2}$ siloxane units, wherein the mole ratio of the combination of $(CH_3)_2CH_2=CHSiO_{1/2}$ units and $(CH_3)_3SiO_{1/2}$ units to $SiO_{4/2}$ units is about 0.7, and the resin contains 1.75 to 2.3 percent by weight of vinyl groups.

Component (B) of the present invention can be prepared by treating a resin copolymer produced according to the method disclosed by Daudt and Tyler in U.S. Pat. No. 2,676,182, with a vinyl-containing endblocking agent. Briefly stated, the method disclosed in U.S. Pat. No. 2,676,182, which is hereby incorporated by reference, comprises reacting a silica hydrosol under acidic conditions with a hexaorganodisiloxane such as hexamethyldisiloxane or a hydrolyzable triorganosilane such as trimethylchlorosilane. The resulting copolymers contain from 2 to 3 percent by weight of hydroxyl groups. The resin of the present invention can be prepared by reacting this product with a vinyl-containing silazane, siloxane, or silane in an amount sufficient to provide from 1 to 5 percent by weight of vinyl groups in the final product. Vinyl-containing endblocking agents are known in the art and exemplified in U.S. Pat. No. 4,584,355 to Blizzard et al.; U.S. Pat. No. 4,591,622 to Blizzard et al.; and U.S. Pat. No. 4,585,836 to Homan et al.; which are hereby incorporated by reference.

The amount of component (B) in the present compositions is typically from 10 to 100 parts by weight and more preferably 30 to 50 parts by weight per 100 parts by weight of component (A).

Component (C) of the present invention is an organohydrogenpolysiloxane having an average of at least three silicon-bonded hydrogen atoms per molecule and an average of no more than one silicon-bonded hydrogen atom per silicon atom. The silicon-bonded hydrogen atoms can be located at terminal, pendant, or at both terminal and pendant positions in the organohydrogenpolysiloxane. Component (C) can be a homopolymer or a copolymer. The structure of the organohydrogenpolysiloxane can be linear, branched, or cyclic. The siloxane units present in component (C) may include $HR^4_2SiO_{1/2}$, $R^4_3SiO_{1/2}$, $HR^4SiO_{2/2}$, $R^4_2SiO_{2/2}$, $HSiO_{3/2}$, $R^4SiO_{3/2}$, and $SiO_{4/2}$ units. In the preceding formulae each $R^4$ is independently selected from the group consisting of monovalent hydrocarbon and monovalent halogenated hydrocarbon groups free of aliphatic unsaturation, as defined previously for component (A). Typically at least 50 percent, and more preferably substantially all of the organic groups in component (C) are methyl. Component (C) can be a single organohydrogenpolysiloxane or a mixture of two or more different organohydrogenpolysiloxanes.

A preferred organohydrogenpolysiloxane is a trimethylsiloxy-terminated dimethylmethylhydrogensiloxane having an average of five methylhydrogensiloxane units and three dimethylsiloxane units per molecule and a silicon-bonded hydrogen content of about 0.7 to 0.8 percent by weight.

Component (C) is present in the compositions of this invention in an amount sufficient to provide from one to three silicon-bonded hydrogen atoms per alkenyl group in components (A) and (B) combined.

Organohydrogenpolysiloxanes which are suitable for use in the compositions of the present invention and methods for their preparation are well known in the art.

To ensure compatibility of components (A), (B), and (C), described supra, the predominant organic group in each component is preferably the same. Preferably this group is methyl.

Component (D) of the present invention is an adhesion promoter that effects strong unprimed adhesion of the compositions to substrates commonly employed in the construction of electronic devices; for example, silicon; passivation coatings, such as silicon dioxide and silicon nitride; glass; metals, such as copper and gold; ceramics; and plastics, such as polyimide. Component (D) can be any adhesion promoter that is soluble in the present compositions, does not outgas during vacuum dispensing, and is free of functional groups that react with any component in the composition at ambient temperature to produce a compound that outgasses during vacuum dispensing. For example, the adhesion promoter is free of hydroxyl groups, which react with the organohydrogenpolysiloxane in the presence of the hydrosilylation catalyst to produce hydrogen gas.

Component (D) can be a single adhesion promoter or a mixture of two or more different adhesion promoters, provided they do not react with each other to produce a compound that outgasses during vacuum dispensing.

Component (D) is added to the compositions of the present invention in an amount sufficient to effect adhesion of the composition to a substrate, such as those cited above. This amount can vary over a wide range depending on the nature of the adhesion promoter, the type of substrate, and the desired adhesive bond strength. Generally, the adhesion promoter comprises from 0.01 to about 10 percent by weight of the present compositions. However, the optimum concentration of component (D) can be readily determined by routine experimentation.

Examples of adhesion promoters suitable for use in the present compositions include, but are not limited to: an alkoxysilane having an aliphatically unsaturated group as disclosed in U.S. Pat. No. 4,196,273; an organosilicon compound containing at least one lower alkenyl group or at least one silicon-bonded hydrogen atom, and at least one epoxy group as disclosed in U.S. Pat. No. 4,082,726; silanes and bis-silylhydrocarbons containing a plurality of silicon-bonded alkoxy groups and at least one substituent that is bonded to silicon through oxygen and contains at least four carbon atoms, two of which form a vinyl group, as disclosed in U.S. Pat. No. 4,659,851; an alkenyl isopropenoxysilane or a product of the partial hydrolysis-condensation thereof, as disclosed in U.S. Pat. No. 3,892,707; and hydrocarbyloxy-substituted organosilicon compounds and condensation products thereof, as disclosed in U.S. Pat. No. 5,424,384; an organosilane containing at least one alkoxy group and at least one epoxy, methacryloxy, or acryloxy group, as disclosed in U.S. Pat. No. 4,906,686; and adhesion additives comprising a silane containing at least one alkoxy or enoloxy group, the remaining valences of the silicon atom being satisfied by groups bonded to silicon through oxygen and containing at least one vinyl group, and at least one organosilicon compound comprising at least one group capable of participating in a hydrosilylation reaction, and at least one silicon-bonded alkoxy, enoloxy, or silanol group, as disclosed in U.S. Pat. No. 5,399,651.

Further examples of adhesion promoters useful in the compositions of the present invention include, but are not limited to: reaction products of a silane containing at least three hydrolyzable groups, a monohydric or polyhydric alcohol containing at least one organofunctional group, and a polyhydric alcohol containing no organofunctional groups or ethylenic unsaturation, as disclosed in U.S. Pat. No. 5,486,565; bis[3-(trimethoxysilyl)alkyl]fumarates, bis[3-(trimethoxysilyl)alkyl]maleates, allyl-[3-(trimethoxysilyl)alkyl]maleates, allyl-[3-(trimethoxysilyl)alkyl]fumarates, or N-[3-(trimethoxysilyl)alkyl]maleimides as disclosed in U.S. Pat. No. 5,164,461; a bis (trialkoxysilylalkyleneoxycarbonylalkylene)amine as disclosed in U.S. Pat. No. 5,342,870; a bis [trialkyloxysilylalkylene]amine or urea as disclosed in U.S. Pat. No. 5,416,144; an organopolysiloxane having an alkoxysilyl group as disclosed in U.S. Pat. No. 5,248,751; and isocyanurates as disclosed in U.S. Pat. No. 4,340,710 and U.S. Pat. No. 5,106,933. The relevant portions of the preceding patents are hereby incorporated by reference to the extent that the adhesion promoters described therein meet the aforementioned requirements for component (D), i.e., the adhesion promoter is soluble in the present compositions, does not outgas during vacuum dispensing, and is free of functional groups that react with any component in the composition at ambient temperature to produce a compound that outgasses during vacuum dispensing.

Preferred adhesion promoters according to the present invention include organosilicon compounds having the average formula:

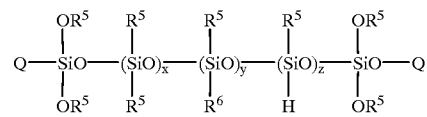

wherein $R^5$ is a monovalent hydrocarbon group free of aliphatic unsaturation, $R^6$ is alkenyl, x has a value of from 0 to 10, y has a value of from 0 to 10, z has a value of 0 to 10, the sum y+z is at least 1, and Q has the formula

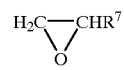

wherein $R^7$ is a divalent organic group. Suitable $R^5$ groups generally contain from 1 to about 6 carbon atoms and are exemplified by, but not limited to methyl, ethyl, propyl, and butyl. Preferably, $R^5$ is methyl. The $R^6$ groups typically have from 2 to about 6 carbon atoms and include, but are not limited to vinyl, allyl, 1-propenyl, and isopropenyl. Preferably, $R^6$ is vinyl. Examples of $R^7$ groups include, but are not limited to methylene, ethylene, propylene, phenylene, chloroethylene, fluoroethylene, —CH$_2$OCH$_2$CH$_2$CH$_2$—, —CH$_2$CH$_2$OCH$_2$CH$_2$—, —CH$_2$CH$_2$OCH(CH$_3$)CH$_2$—, and —CH$_2$OCH$_2$CH$_2$OCH$_2$CH$_2$—. Preferably, R$^7$ is —CH$_2$OCH$_2$CH$_2$CH$_2$—. The preceding class of adhesion promoters, inter alia, is exemplified in U.S. Pat. No. 4,082,726, which is hereby incorporated by reference. Methods for the preparation of these organosilicon compounds are well known in the art.

Specific examples of preferred adhesion promoters according to the present invention are

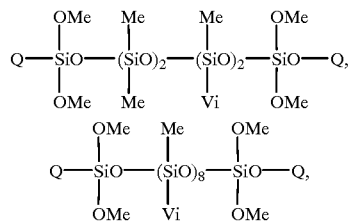

and mixtures thereof, wherein Q is

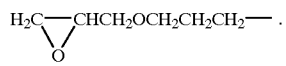

Component (E) of the present invention is a hydrosilylation catalyst comprising a platinum group metal or a compound containing such a metal that promotes the addition reaction of components (A) and (B) with component (C). These metals include platinum, rhodium, ruthenium, palladium, osmium and iridium. Platinum and platinum compounds are preferred based on the high activity level of these catalysts in hydrosilylation reactions. A preferred class of platinum catalysts are the complexes of chloroplatinic acid with certain vinyl-containing organosiloxane compounds disclosed by Willig in U.S. Pat. No. 3,419,593, which is hereby incorporated by reference. A particularly preferred catalyst of this type is the reaction product of chloroplatinic acid and 1,3-diethenyl-1,1,3,3-tetramethyldisoxane.

The hydrosilylation catalyst is present in an amount sufficient to provide from 0.1 to 1000, preferably 1 to 500, and more preferably 1 to 50 parts per million of a platinum group metal, based on the combined weight of components (A), (B), and (C). The rate of cure is very slow below 0.1 ppm of platinum group. The use of more than 1000 ppm of platinum group metal results in no appreciable increase in cure rate, and is therefore uneconomical.

Mixtures of the aforementioned components (A), (B), (C), (D), and (E) may begin to cure at ambient temperature. To obtain a longer working time or "pot life", the activity of the catalyst under ambient conditions is retarded or suppressed by the addition of a suitable inhibitor.

Component (F) of the present invention is a platinum catalyst inhibitor having a boiling point greater than 150° C. at 0.10 MPa. The platinum catalyst inhibitor retards curing of the present compositions at ambient temperature, but does not prevent the composition from curing at elevated temperatures. In order to be effective in this invention, component (E) must be soluble in the composition. Suitable platinum catalyst inhibitors include various "ene-yne" systems such as 3-methyl-3-penten-1-yne and 3,5-dimethyl-3-hexen-1-yne; acetylenic alcohols such as 3,5-dimethyl-1-hexyn-3-ol, 1-ethynyl-1-cyclohexanol, and 2-Phenyl-3-butyn-2-ol; maleates and fumarates, such as the well known dialkyl, dialkenyl, and dialkoxyalkyl fumarates and maleates; cyclovinylsiloxanes; and benzyl alcohol.

Acetylenic alcohols constitute a preferred class of inhibitors and 2-phenyl-3-butyn-2-ol is a particularly preferred inhibitor in the compositions of the present invention. Compositions containing these inhibitors generally require heating at 70° C. or above to cure at a practical rate.

The platinum catalyst inhibitor is added to the present compositions in an amount sufficient to retard curing of the compositions at ambient temperature without preventing or excessively prolonging cure at elevated temperatures. This amount will vary widely depending on the particular inhibitor used, the nature and concentration of the hydrosilylation catalyst, and the nature of the organohydrogenpolysiloxane.

Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. Generally, component (F) is present in an amount from 1 to 100 moles per mole of platinum group metal. The optimum concentration for a particular inhibitor in a given composition can be readily determined by routine experimentation.

In addition to components (A) through (E), the compositions of the present invention may further comprise an inorganic filler. Fillers suitable for use in the compositions of the present invention have a high radiological purity; low coefficient of thermal expansion; low levels of ionic impurities such as sodium, potassium, and chloride; and low moisture content. Examples of preferred fillers include, but are not limited to fused silica (fused quartz), alumina, boron nitride, and aluminum nitride. Fused silica is a particularly preferred filler in compositions used to encapsulate random access memory (RAM) devices, which are very sensitive to alpha particle emissions.

The average particle size of the filler is typically from 2 to 25 $\mu$m and preferably from 2 to 10 $\mu$m. When the average particle size is less than about 2 $\mu$m, the viscosity of the composition may be too high for use in vacuum dispensing. When the average particle size is greater than about 25 $\mu$m, the particles may be excluded by the comparatively smaller dimensions of a semiconductor device. Also, the larger filler particles tend to settle in the compositions rather than remaining in suspension.

Although, the shape of the filler particles is not critical, particles having a spherical shape are preferred because they generally impart a smaller increase in viscosity to the composition than particles having other shapes.

The amount of filler in the present compositions is typically from 10 to 100 parts per 100 parts of component (A). However, the filler should not be used an amount that increases the viscosity of the composition above 100 Pa·s at 25° C. prior to cure.

The compositions of the instant invention are typically prepared by combining components (A) through (F) and, optionally a filler, in the stated proportions and then de-airing the composition. Mixing can be accomplished by any of the techniques known in the art such as milling, blending, and stirring, either in a batch or continuous process. The particular device is determined by the viscosity of the components and the final composition. Preferably, the hydrosilylation catalyst is added last at a temperature below about 30° C. to prevent premature curing of the composition and thus ensure adequate working time. Also, the components are preferably mixed under vacuum at a pressure of from about 3,400 to about 16,900 Pa to minimize the inclusion of air in the composition.

Alternatively, the composition of the present invention can be a multi-part composition comprising components (A) through (F) in two or more parts. The multi-part composition can contain any number of different parts containing different amounts of different ingredients, provided that neither the polydiorganosiloxane nor the organopolysiloxane resin are present with the organohydrogenpolysiloxane and hydrosilylation catalyst in the same part. In a typical method for preparing such a composition, a portion of the polydiorganosiloxane, a portion of the organopolysiloxane resin, the adhesion promoter, the hydrosilylation catalyst, and any filler or additives are mixed together to produce Part A, and the remaining portions of the polydiorganosiloxane and resin, organohydrogenpolysiloxane, and platinum catalyst inhibitor are mixed together to produce part B. The individual parts of the multi-part composition are de-aired according to the method described below. Preferably, the components are packaged in such as manner that equal weight amounts of each package can be mixed to produce the compositions of this invention.

The one-part compositions and the individual parts of the multi-part composition must be thoroughly de-aired prior to use in a vacuum dispensing process. Preferably, de-airing is performed by passing the composition through a falling film evaporator at ambient temperature under a pressure of less than 1333 Pa, and preferably under a pressure of about 667 Pa. According to the preferred method, the composition passes through one or more slits in the head assembly into the vacuum chamber at a rate of 227 grams per minute. The slit forces the material into a thin ribbon having a high surface area and short diffusion path for air or other gases to escape. The ribbon falls through the vacuum chamber a distance of 0.6 m into a press pot. After all of the material has fallen into the pot, the vacuum is maintained for at least fifteen minutes to ensure thorough removal of air. Air is then slowly readmitted into the system and the material is pressed out of the pot into suitable containers. For the purposes of the present invention, a composition de-aired according to the preceding method, which is further delineated in Example 1, or by any other method that produces an equivalent composition, is termed "substantially free of air". Different combinations of flow rate, pressure, vacuum chamber length, and temperature than those recited above can be used to produce the compositions of the present invention. The precise set of conditions required to produce compositions substantially free of air, as defined supra, can be determined by routine experimentation. An airless mixing technique known in the art should be used to combine the de-aired parts of the multi-part composition.

It is important to note that for the purposes of the present invention, the composition is de-aired prior to introduction into the vacuum dispensing equipment. The vacuum created in the vacuum dispenser alone is not of a sufficient nature to produce the compositions of the present invention. As used herein, the term "de-airing" does not refer to removal of air during vacuum dispensing.

Air may also be removed from the present compositions by any other method that produces a de-aired composition equivalent to the composition obtained using the aforementioned falling film evaporation technique. For example, methods typically employed to remove solvents from polymer compositions, such as wiped-film evaporation and rotary evaporation, can be used to produce compositions substantially free of air. The precise conditions required to produce a de-aired composition equivalent to that obtained by the falling film evaporation process cited above will depend on the particular method and can be determined by routine experimentation. Preferably, air is removed from the one-part compositions of the present invention at a temperature of from 20° C. to 30° C.

The compositions of the present invention should be stored in sealed containers to prevent exposure to air and moisture. Preferably, the compositions are stored in foil bags that are heat sealed under vacuum. A preferred package is an aluminized polyethylene/polyester bag. Such a bag is commercially available from LPS Industries (Newark, N.J.) under the trade name Vapor Flex® VF-52. The one part product of the present invention may be stored at room temperature for several weeks without any change in the properties of the cured encapsulant product. However, the shelf life of the compositions of this invention can be extended to several months by storing the mixtures at a temperature below 0° C. and preferably from −20 to −30° C. Individual sealed packages of the multi-part composition described above can be stored for over 6 months at ambient conditions without any deterioration in the performance of the composition produced upon their admixture.

The compositions of this invention can be cured by heating at temperatures of from 70 to 200° C., preferably from 80 to 150° C., for a suitable length of time. For example, the compositions typically cure in about two hours at 80° C. and in about fifteen minutes at 150° C.

In general, the compositions of the present invention can further comprise small amounts of additional ingredients typically used in the formulation of silicone compositions, provided the ingredient does not contribute to gas evolution under vacuum dispense conditions or otherwise adversely affect the properties of the liquid composition or the cured encapsulant. Such ingredients include, but are not limited to, surfactants, chain extenders, antioxidants, pigments, stabilizers, and fillers. Carbon black is a preferred pigment in the present compositions.

The cured compositions of the present invention have good adhesion to numerous substrates commonly employed in the construction of semiconductor devices, including metals, glass, silicon, silicon dioxide, ceramics, paper, rubbers, and plastics.

EXAMPLES

The following examples are presented to further illustrate the compositions of this invention, but are not to be considered as limiting the invention, which is delineated in the appended claims.

All parts and percentages reported in the examples are by weight. Vacuum dispensing was performed using a CAM/ALOT 3900 system (Camelot Systems Inc., Haverhill, Mass.) under a pressure of 5080 Pa.

Example 1

This example demonstrates the preparation and packaging of a composition according to the present invention. A blend of an organohydrogenpolysiloxane and a platinum catalyst inhibitor was prepared by mixing 10.2 parts of a trimethylsiloxy-terminated dimethylmethylhydrogen siloxane containing an average of five $HMeSiO_{2/2}$ units and three $Me_2SiO_{2/2}$ units per molecule and having a viscosity of $4.8 \times 10^{-3}$ Pa·s and 1.3 parts of 2-phenyl-3-butyn-2-ol at 70° C. for 20 minutes. A base was prepared by mixing 81.2 parts of fused silica having an average particle size of 4.5±0.5 microns; 73.4 parts of a dimethylvinylsiloxy-terminated polydimethylsiloxane having an average DP of 830 and a viscosity of 55 Pa·s; 26.6 parts of a dimethylvinylsiloxy-terminated polydimethylsiloxane having an average DP of 434 and a viscosity of 2 Pa·s; 44.4 parts of a resin consisting essentially of $(CH_3)_2CH_2\text{=}CHSiO_{1/2}$ units, $(CH_3)_3SiO_{1/2}$ units, and $SiO_{4/2}$ units, wherein the mole ratio of total triorganosiloxane units to $SiO_{4/2}$ units is about 0.7:1 and the resin contains about 2.0 weight percent of vinyl groups; and 2.5 parts of an organosilicon compound having the average formula

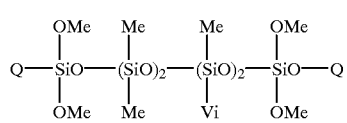

(1)

where Q is

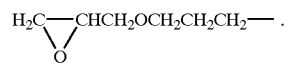

To the base was added the blend of the organohydrogenpolysiloxane and the inhibitor. Finally, 0.9 parts of a platinum complex of 1,3-diethenyl-1,1,3,3-tetramethyldisiloxane was added to the mixture. The resulting composition was mixed until homogenous using a shear mixer. All mixing operations were carried out under a pressure of from 6773 Pa to 10,159 Pa except during the addition of components to the mixture.

The material was then transferred to a 19 L polypropylene pail and pumped into a falling film evaporation system. The vacuum chamber in the apparatus was maintained at a pressure of 667 Pa. The composition passed through two slits in the head assembly, each having a length of 38.1 mm and a width of 3.2 mm, into the vacuum chamber at a rate of 227 grams per minute. The two ribbons of material emerging from the head assembly fell a distance of 0.6 m into a press pot. After all of the material had fallen into the pot, the system was held under vacuum for an additional 15 minutes. Air was then slowly readmitted into the apparatus. The composition was mechanically pressed out of the bottom of the pot and withdrawn into polyethylene syringes (30 cm³). Furthermore the syringes were placed in Vapor Flex® VF-52 aluminized polyethylene/polyester bags (LPS Industries, Newark, N.J.) containing silica gel desiccant. The bags were heat sealed under vacuum and then stored in a freezer at –20° C.

Example 2

This example demonstrates the effects of platinum catalyst inhibitors having different boiling points on the extent of outgassing for compositions dispensed under vacuum. A blend of each inhibitor and an organohydrogenpolysiloxane was prepared by mixing 1.3 parts of the inhibitor and 10.3 parts of the organohydrogenpolysiloxane used in Example 1. Four bases were prepared by mixing 82.1 parts of fused silica having an average particle size of 4.5±0.5 microns, 100 parts of a vinyl-terminated polydimethylsiloxane having an average DP of 830 and a viscosity of 55 Pa·s; 44.9 parts of the resin used in example 1; and 2.6 parts of adhesion promoter (1). To each base was added one of the inhibitor-organohydrogenpolysiloxane blends. Finally, 0.9 parts of a platinum complex of 1,3-diethenyl-1,1,3,3-tetramethyldisiloxane was added to each mixture. The resulting compositions were mixed until homogeneous using a shear mixer. All mixing operations were carried out under a pressure of from 6773 Pa to 10,159 Pa except during the addition of components to the mixture.

A portion of the composition containing 2-phenyl-3-butyn-2-ol and the entire amount of each of the other compositions were de-aired according to the method in example 1. The compositions were withdrawn into polyethylene syringes (30 cm³) and the syringes were placed in Vapor Flex® VF-52 aluminized polyethylene/polyester bags (LPS Industries, Newark, N.J.) containing silica gel desiccant. The bags were heat sealed under vacuum and then stored in a freezer at –20 ° C. The compositions were removed from the freezer just prior to use and allowed to warm to room temperature.

Each composition, including the composition not de-aired, was used to encapsulate an array of 30 dies mounted on a flexible circuit tape. Each die assembly consists of a silicon die (3×5 mm) and a polyimide tape separated by an elastomer pad or spacer. The composition was vacuum dispensed along three sides of each silicon die. A waiting period of 1 to 2 minutes was observed to allow the material to wet the die. Encapsulant was then dispensed on the fourth side of each die. Approximately 0.03 grams of composition was dispensed per die. The extent of degassing for each composition was determined by visual inspection of the encapsulant during vacuum dispensing. The results are presented in Table I.

TABLE I

| Platinum Catalyst Inhibitor | Boiling Point of Inhibitor, ° C. (0.10 MPa) | Extent of Degassing[a] |
|---|---|---|
| 2-Methyl-3-butyn-2-ol | 104 | 4 |
| 3,5-Dimethyl-l-hexyn-3-ol | 150 | 3 |
| 1-Ethynyl-1-cyclohexanol | 180 | 2 |
| 2-Phenyl-3-butyn-2-ol | 217 | 1 |
| 2-Phenyl-3-butyn-2-ol[b] | 217 | 5 |

[a]1 = no visible bubbling, no contamination of die; 2 = minor bubbling, minor contamination of die, no cleanup required; 3 = moderate bubbling, contamination of die, cleanup required; 4 = vigorous bubbling, contamination of die, voids, cleanup required; 5 = vigorous bubbling and foaming, gross contamination of die, voids, cleanup required.
[b]Composition not de-aired.

That which is claimed is:

1. A silicone composition comprising:
   (A) 100 parts by weight of a polydiorganosiloxane containing an average of at least two silicon-bonded alkenyl groups per molecule;
   (B) 10 to 100 parts by weight of an organopolysiloxane resin consisting essentially of (a) $R^3_2(CH_2\text{=}CH)SiO_{1/2}$ siloxane units, (b) $R^3_3SiO_{1/2}$ siloxane units, and (c) $SiO_{4/2}$ siloxane units wherein each $R^3$ is independently selected from the group consisting of monovalent hydrocarbon and monovalent halogenated hydrocarbon groups free of aliphatic unsaturation, the mole ratio of the combination of (a) and (b) units to (c) units is from 0.6:1 to 1.1:1, and the resin contains from 1 to 5 percent by weight of vinyl groups;
   (C) an organohydrogenpolysiloxane having an average of at least three silicon-bonded hydrogen atoms per molecule in an amount sufficient to provide from one to three silicon-bonded hydrogen atoms per alkenyl group in components (A) and (B) combined;
   (D) an adhesion promoter in an amount sufficient to effect adhesion of the composition to a substrate;
   (E) a hydrosilylation catalyst in an amount sufficient to provide from 0.1 to 1000 parts per million of a platinum group metal based on the combined weight of components (A), (B) and (C); and
   (F) a platinum catalyst inhibitor having a boiling point greater than 150° C. at 0.10 MPa in an amount sufficient to retard curing of the composition at ambient temperature; and wherein the composition comprising components (A) through (F) is substantially free of air.

2. The composition according to claim 1, wherein the polydiorganosiloxane has a viscosity of from 1 to 100 Pa·s at 25° C.

3. The composition according to claim 1, wherein component (A) comprises a first polydiorganosiloxane having a viscosity of from 45 to 65 Pa·s at 25° C. and a second polydiorganosiloxane having a viscosity of from 1.8 to 2.4 Pa·s at 25° C.

4. The composition according to claim 1, wherein component (A) is free of aryl groups.

5. The composition according to claim 1, wherein the adhesion promoter is an organosilicon compound having the average formula:

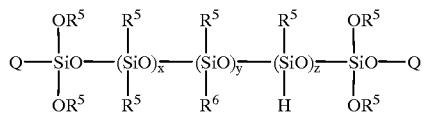

wherein $R^5$ is a monovalent hydrocarbon group free of aliphatic unsaturation, $R^6$ is alkenyl, x has a value of from 0 to 10, y has a value of from 0 to 10, z has a value of from 0 to 10, the sum y+z is at least 1, and Q has the formula:

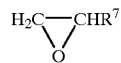

wherein $R^7$ is a divalent organic group.

6. The composition according to claim 5, wherein $R^5$ is methyl, $R^6$ is vinyl, x is 2, y is 2, z is 0, and $R^7$ is —$CH_2OCH_2CH_2CH_2$—.

7. The composition according to claim 1, further comprising an inorganic filler selected from the group consisting of alumina, boron nitride, aluminum nitride, and fused silica.

8. The composition according to claim 7, wherein the inorganic filler is fused silica.

9. The composition according to claim 1, wherein the platinum catalyst inhibitor is an acetylenic alcohol.

10. The composition according to claim 9, wherein the acetylenic alcohol is 2-phenyl-3-butyn-2-ol.

11. The composition according to claim 5, wherein component (A) is a polydiorganosiloxane having the general formula $R^2R^1{}_2SiO(R^1{}_2SiO)_nSiR^1{}_2R^2$ wherein each $R^1$ is independently selected from the group consisting of monovalent hydrocarbon and monovalent halogenated hydrocarbon groups free of aliphatic unsaturation, $R^2$ is alkenyl, and n has a value such that the viscosity of component (A) is from 1 to 100 Pa·s at 25° C.; (B) is an organopolysiloxane resin consisting essentially of $(CH_3)_2CH_2$=$CHSiO_{1/2}$ siloxane units, $(CH_3)_3SiO_{1/2}$ siloxane units, and $SiO_{4/2}$ siloxane units; (C) is a trimethylsiloxy-terminated dimethylmethylhydrogensiloxane having an average degree of polymerization of 10; (E) is a platinum catalyst; and (F) is an acetylenic alcohol.

12. The composition according to claim 11, further comprising an inorganic filler selected from the group consisting of alumina, boron nitride, aluminum nitride, and fused silica.

13. The composition according to claim 1, wherein the composition is contained in a sealed package.

14. A cured composition, comprising a reaction product of the composition of claim 1.

15. A cured composition, comprising a reaction product of the composition of claim 2.

16. A cured composition, comprising a reaction product of the composition of claim 3.

17. A cured composition, comprising a reaction product of the composition of claim 5.

18. A cured composition, comprising a reaction product of the composition of claim 7.

19. A cured composition, comprising a reaction product of the composition of claim 9.

20. A multi-part silicone composition, comprising:
(A) 100 parts by weight of a polydiorganosiloxane containing an average of at least two silicon-bonded alkenyl groups per molecule;
(B) 10 to 100 parts by weight of an organopolysiloxane resin consisting essentially of (a) $R^3{}_2(CH_2$=$CH)SiO_{1/2}$ siloxane units, (b) $R^3{}_3SiO_{1/2}$ siloxane units, and (c) $SiO_{4/2}$ siloxane units wherein each $R^3$ is independently selected from the group consisting of monovalent hydrocarbon and monovalent halogenated hydrocarbon groups free of aliphatic unsaturation, the mole ratio of the combination of (a) and (b) units to (c) units is from 0.6:1 to 1.1:1, and the resin contains from 1 to 5 percent by weight of vinyl groups;
(C) an organohydrogenpolysiloxane having an average of at least three silicon-bonded hydrogen atoms per molecule in an amount sufficient to provide from one to three silicon-bonded hydrogen atoms per alkenyl group in components (A) and (B) combined;
(D) an adhesion promoter in an amount sufficient to effect adhesion of the composition to a substrate;
(E) a hydrosilylation catalyst in an amount sufficient to provide from 0.1 to 1000 parts per million of a platinum group metal based on the combined weight of components (A), (B) and (C); and
(F) a platinum catalyst inhibitor having a boiling point greater than 150° C. at 0.10 MPa in an amount sufficient to retard curing of the composition at ambient temperature; wherein each part of the composition is substantially free of air, and with the proviso that neither the polydiorganosiloxane nor the organopolysiloxane resin are present with the organohydrogenpolysiloxane and the hydrosilylation catalyst in the same part.

21. The composition according to claim 20, wherein component (A) is a polydiorganosiloxane having the general formula $R^2R^1{}_2SiO(R^1{}_2SiO)_nSiR^1{}_2R^2$ wherein each $R^1$ is independently selected from the group consisting of monovalent hydrocarbon and monovalent halogenated hydrocarbon groups free of aliphatic unsaturation, $R^2$ is alkenyl, and n has a value such that the viscosity of component (A) is from 1 to 100 Pa·s at 25° C.; (B) is an organopolysiloxane resin consisting essentially of $(CH_3)_2CH_2$=$CHSiO_{1/2}$ siloxane units, $(CH_3)_3SiO_{1/2}$ siloxane units, and $SiO_{4/2}$ siloxane units; (C) is a trimethylsiloxy-terminated dimethylmethylhydrogensiloxane having an average degree of polymerization of 10; (D) is an organosilicon compound having the average formula:

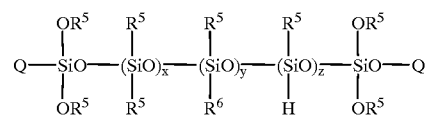

wherein $R^5$ is a monovalent hydrocarbon group free of aliphatic unsaturation, $R^6$ is alkenyl, x has a value of from 0 to 10, y has a value of from 0 to 10, z has a value of from 0 to 10, the sum y+z is at least 1, and Q has the formula

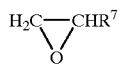

wherein $R^7$ is a divalent organic group; (E) is a platinum catalyst; and (F) is an acetylenic alcohol.

22. The composition according to claim 20, further comprising an inorganic filler selected from the group consisting of alumina, boron nitride, aluminum nitride, and fused silica.

23. A method of preparing a silicone composition, comprising the steps of:
(I) mixing
(A) 100 parts by weight of a polydiorganosiloxane containing an average of at least two silicon-bonded alkenyl groups per molecule;
(B) 10 to 100 parts by weight of an organopolysiloxane resin consisting essentially of (a) $R^3{}_2(CH_2{=}CH)SiO_{1/2}$ siloxane units, (b) $R^3{}_3SiO_{1/2}$ siloxane units, and (c) $SiO_{4/2}$ siloxane units wherein each $R^3$ is independently selected from the group consisting of monovalent hydrocarbon and monovalent halogenated hydrocarbon groups free of aliphatic unsaturation, the mole ratio of the combination of (a) and (b) units to (c) units is from 0.6:1 to 1.1:1, and the resin contains from 1 to 5 percent by weight of vinyl groups;
(C) an organohydrogenpolysiloxane having an average of at least three silicon-bonded hydrogen atoms per molecule in an amount sufficient to provide from one to three silicon-bonded hydrogen atoms per alkenyl group in components (A) and (B) combined;
(D) an adhesion promoter in an amount sufficient to effect adhesion of the composition to a substrate;
(E) a hydrosilylation catalyst in an amount sufficient to provide from 0.1 to 1000 parts per million of a platinum group metal based on the combined weight of components (A), (B) and (C); and
(F) a platinum catalyst inhibitor having a boiling point greater than 150° C. at 0.10 MPa in an amount sufficient to retard curing of the composition at ambient temperature; and
(II) de-airing the mixture to produce a composition substantially free of air.

24. The method according to claim 23, wherein component (A) is a polydiorganosiloxane having the general formula $R^2R^1{}_2SiO(R^1{}_2SiO)_nSiR^1{}_2R^2$ wherein each $R^1$ is independently selected from the group consisting of monovalent hydrocarbon and monovalent halogenated hydrocarbon groups free of aliphatic unsaturation, $R^2$ is alkenyl, and n has a value such that the viscosity of component (A) is from 1 to 100 Pa·s at 25° C.; (B) is an organopolysiloxane resin consisting essentially of $(CH_3)_2CH_2{=}CHSiO_{1/2}$ siloxane units, $(CH_3)_3SiO_{1/2}$ siloxane units, and $SiO_{4/2}$ siloxane units; (C) is a trimethylsiloxy-terminated dimethylmethylhydrogensiloxane having an average degree of polymerization of 10; (D) is an organosilicon compound having the average formula:

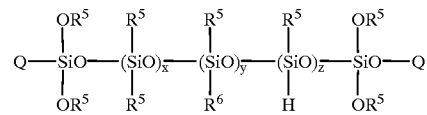

wherein $R^5$ is a monovalent hydrocarbon group free of aliphatic unsaturation, $R^6$ is alkenyl, x has a value of from 0 to 10, y has a value of from 0 to 10, z has a value of from 0 to 10, the sum y+z is at least 1, and Q has the formula

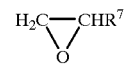

wherein $R^7$ is a divalent organic group; (E) is a platinum catalyst; and (F) is an acetylenic alcohol.

25. The method according to claim 23, wherein the mixture formed prior to de-airing further comprises an inorganic filler selected from the group consisting of alumina, boron nitride, aluminum nitride, and fused silica.

26. The method according to claim 23, wherein the step of de-airing comprises passing the mixture through a falling film evaporator under a vacuum.

27. The method according to claim 26, wherein the step of de-airing is carried out at a pressure of less than 1333 Pa and at a temperature of from 20 to 30° C.

28. The method according to claim 23, wherein the step of de-airing the mixture comprises de-airing components (A) through (F) individually prior to mixing.

29. The method according to claim 23, wherein the step of de-airing the mixture comprises de-airing partial mixtures of components (A) through (F) prior to mixing.

30. A composition prepared according to the method of claim 23.

31. A composition prepared according to the method of claim 24.

32. A composition prepared according to the method of claim 25.

33. A composition prepared according to the method of claim 26.

* * * * *